United States Patent [19]

Rothman et al.

[11] 3,883,595

[45] May 13, 1975

[54] PROCESS FOR THE PREPARATION OF BETA DICARBONYL

[75] Inventors: Edward S. Rothman, North Hills; Gordon G. Moore, Willow Grove, both of Pa.

[73] Assignee: The United States of America as represented by the Secretary of Agriculture, Washington, D.C.

[22] Filed: Dec. 19, 1973

[21] Appl. No.: 426,160

Related U.S. Application Data

[63] Continuation-in-part of Ser. No. 41,573, May 28, 1970, abandoned.

[52] U.S. Cl. ................................................. 260/595
[51] Int. Cl. ............................................. C07c 49/02
[58] Field of Search ..................................... 260/595

[56] References Cited
UNITED STATES PATENTS 2,395,800   3/1946   Boese et al. .................. 260/595
3,356,731   12/1967   Nilsson et al. ................... 260/586

OTHER PUBLICATIONS

Rothman, J. Org. Chem., 31, (1966), pp. 628–629.
Young et al., J.A.C.S., 72, pp. 3635–3641.

*Primary Examiner*—Bernard Helfin
*Assistant Examiner*—James H. Reamer
*Attorney, Agent, or Firm*—M. Howard Silverstein; Max D. Hensley; William E. Scott

[57] ABSTRACT

Beta dicarbonyl compounds are prepared by reacting an enol ester with aluminum chloride in the presence of an inert solvent at a temperature range of 20° to 50°C. An isopropenyl ester of an aliphatic fatty acid is used to prepare beta diketone and a vinyl ester is used to prepare beta keto aldehyde. When reacted with any of several metals the dicarbonyl compounds form chelates.

7 Claims, No Drawings

PROCESS FOR THE PREPARATION OF BETA DICARBONYL

This application is a continuation-in-part of application Ser. No. 41,573, filed May 28, 1970 now abandoned.

This invention relates to a novel and facile preparation of beta dicarbonyl compounds and more particularly to the isomerization of vinyl esters and the more deep-seated alteration of isopropenyl esters by means of aluminum chloride catalysis to form beta keto aldehydes in the former instance and beta diketones in the latter instance.

The dicarbonyl compounds of this invention form useful complex salts of the type generally known as chelate compounds when reacted with any of several metals. The metallo-chelates are useful as catalysts. The dicarbonyl compounds are used as scavengers of metallic ions in processes such as ore concentration and separation of constituent metals. for example, the copper chelate derivatives of the diketones formed by the reaction of vinyl stearate with aluminum chloride are soluble in organic solvents and the copper chelates are separable by chromatography in benzene or chloroform solution on inorganic supports.

In general, according to this invention an isopropenyl ester of an aliphatic fatty acid, or alternatively a vinyl ester of an aliphatic fatty acid, is diluted with an inert hydrocarbon diluent such as hexane, a six carbon chain length saturated alkane, and treated with 0.2 to 1.0 moles of anhydrous aluminum chloride at about from room temperature to 45°C., for about half an hour, after which the aluminum chloride is destroyed with aqueous dilute hydrochloric acid, and the products are isolated by solvent extraction. It is often convenient to convert the products to the copper chelates to facilitate the purification of product since the metal chelates are well-crystallized, sharp-melting compounds. Typically, the chelates are distinctly colored, e.g., distearoylmethane and dipalitoylmethane are lilac colored, and formylstearoylmethane is blue-gray.

Side reactions are of no significance under the conditions of the reaction. It is to be emphasized that the diketone products are symetrical diketones and not the derivatives RCO—CH₂ CO=CH₃ obtained by isomerizations previously reported[J.Org. Chem 31, 628(1966)].

The reaction of the isopropenyl esters is illustrated by the following equation:

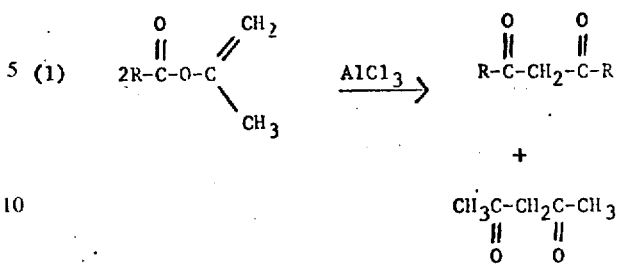

$R = CH_3, C_8H_{17}, C_{15}H_{31}, C_{17}H_{35}$ $R = CH_3, C_8H_{17}, C_{15}H_{31}, C_{17}H_{35}$

The chelate formation is illustrated for distearoyl methane in equation 2;

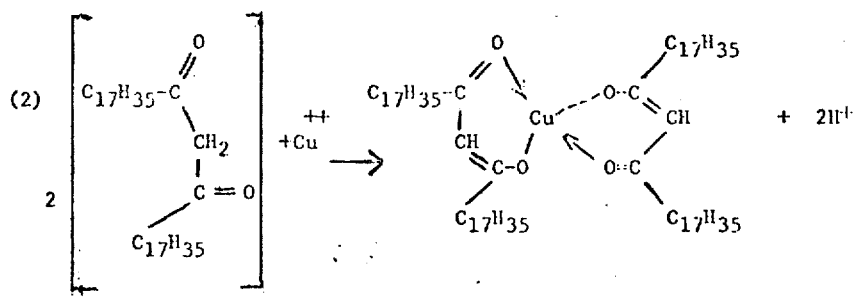

In our experience the similar reaction of, e.g., vinyl stearate gives not only the expected beta keto aldehyde II, but also, distearoylmethane I, see equation 3.

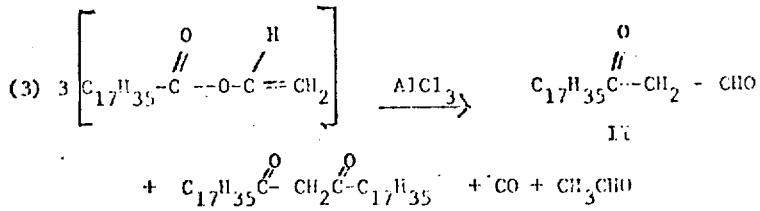

The advantages of the present invention include the simplicity of the route whereby valuable diketones are obtained in a single step from vinyl and isopropenyl esters, and a process that is generally applicable with enol esters from that of acetic acid ($C_2$) to that of stearic acid ($C_{18}$) without the need of high temperatures or vapor phase conditions.

Although hexane was the chosen solvent in the experimental work, it was chosen because of availability inertness to both aluminum chloride and the enol esters used in this invention and not because it was the only solvent that would function. Other saturated alkanes with a 5 to 10 carbon atom chain-length function equally as well as hexane in the process of this invention. However, unexpectedly, we found that the catalyst, aluminum chloride, is a critical part of the process. Without the catalyst the process is not operable. In fact, when a trace of mineral acid was substituted for the aluminum chloride, a totally different substance was formed.

In this invention an enol ester having from 11 to 21 carbon atoms is used to prepare symmetrical beta dicarbonyl compounds and symmetrical beta diketones having from 17 to 37 carbon atoms. Since these are rather high molecular weight compounds, they are not volatile and cannot be distilled or used in a vapor phase process such as those used for lower molecular weight compounds. At temperatures of 300°–700° used in the art to distill lower molecular weight esters such as the enol ester of benzoate of acetone, the high molecular weight compounds of this invention would decompose or prolyze. Consequently, in the process of this invention, reaction temperatures were limited to the range of from about 20° to 50°C.

The following examples illustrate the invention but are not intended to have a limiting effect on its scope.

EXAMPLE I

Distearoylmethane (heptatriacontane -18,30-dione)

Isopropenyl stearate, 19 g., (0.06 mole) in 25 ml. of hexane was treated with aluminum chloride, 8.5 g., (0.06 mole) with occasional cooling in a waterbath to keep temperature below 40°C. After stirring 0.5 hr. at 40°C. the mixture was poured into a mixture of dillute hydrochloric acid and methylene chloride to destroy the catalyst and extract the product. After separation of the organic layer and evaporation of the methylene chloride the diketone was crystallized directly from methanol to give white plates m.p. 77.3°–77.8°, UV max. (isooctane) 273 mu (E = 12000), ir 6.24u (chloroform), NMR 3.54, 5.41. The copper chelate derivative was prepared by mixing hot alcoholic solutions of the diketone and cupric acetate. Crystallization of the lilac-colored crystalline product gave the chelate m.p. 113.2°–114.0°C. The chelate may be reconverted to the free diketone by shaking its chloroform solution with dilute aqueous hydrochloric acid and evaporating the chloroform layer.

EXAMPLE II

Dipalmitoylmethane

Vinyl palmitate, 145 gram (0.51 mole) dissolved in 400 mls of olefin-free hexane was heated, portionwise with 85 g. (0.6 mole) of anhydrous aluminum chloride added at such a rate that the evolved heat did not allow the temperature to rise more than about 30°C. The mixture was then refluxed for an hour, cooled, and poured into a mixture of 1 liter of water, 300 ml. of concentrated hydrochloric acid and 1.5 l. of methylene chloride. The methylene chloride layer was separated (methanol assisted in controlling emulsion problems) dried, and the solvent was evaporated. The residue, dissolved in hot ethanol, was treated with hot aqueous cupric acetate in slight access whereupon 120 g. of mixed copper chelates separated and were collected on a filter. Chromatography on magnesium silicate gave via hot benzene elution 50 g. of the lilac colored copper chelate derivative of dipalmitoylmethane m.p. 113°–114°C., infrared maxima (in chloroform) at 1,405 and 1,560 waves per centimeter. Further elution with 1:1 methylene chloride/ether gave the blue colored copper chelate derivative of formylpalmitoylmethane m.p. 106°–108°C.

EXAMPLE III

In a manner similar to Example I, isopropenyl octanoate was converted to dioctanoyl methane m.p. 20°–21°C., UV 274 mμ (isooctane) (E=11,000), copper chelate derivative, m.p. 110.2°–110.7°C., ir 1,350, 1,410, 1,458, 1,554 cm$^{-1}$ (CHCl$_3$).

EXAMPLE IV

In a manner similar to example II vinyl laurate was converted to dilaurylmethane; copper chelate, m.p. 107°–109°C.; and to lauroylformylmethane, copper chelate m.p. 100°–102°C.

EXAMPLE V

In a manner similar to example II vinyl stearate was converted to distearoylmethane m.p. 72°C. (copper chelate derivative m.p. 114°C.) and stearoylformylmethane m.p. 58°–60°C. (copper chelate m.p. 128°–129°C.)

We claim:

1. A process for the preparation of symmetrical beta dicarbonyl compounds of the formula

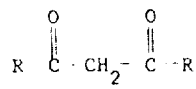

wherein R is a straight chain alkyl group having from 7 to 17 carbon atoms, comprising heating at a temperature of from about 20° to 50°C. in the presence of a saturated alkane solvent having a carbon chain length of from 5 to 10, aluminum chloride and an enol ester of the formula

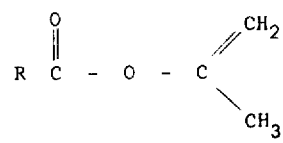

wherein R is an alkyl group from 7 to 17 carbon atoms, said solvent dissolving both the aluminum chloride and the enol ester and being inert to the reactants and to the product.

2. A process for the preparation of symmetrical beta diketones comprising reacting at a temperature of from 20° to 50°C. in the presence of a saturated alkane solvent having a carbon chain length of from 5 to 10, aluminum chloride with an enol ester selected from the group consisting of isopropenyl stearate, isopropenyl palmitate, isopropenyl laurate and isopropenyl octanoate, said solvent dissolving both the aluminum chloride and the enol ester and being inert to the reactants and to the products.

3. The process of claim 2 in which the enol ester is isopropenyl stearate.

4. The process of claim 2 in which the enol ester is isopropenyl octanoate.

5. The process of claim 2 in which the enol ester is isopropenyl palmitate.

6. The process of claim 2 in which the enol ester is isopropenyl laurate.

7. The process of claim 2 in which the enol ester is isopropenyl acetate.

* * * * *